United States Patent [19]
Tseng et al.

[11] Patent Number: 5,318,309
[45] Date of Patent: Jun. 7, 1994

[54] BRUSH SEAL

[75] Inventors: Wu-Yang Tseng, West Chester; Christopher C. Glynn, Hamilton; Brent L. Bristol, Milford; Rolf R. Hetico, Cincinnati, all of Ohio

[73] Assignee: General Electric Company, Cincinnati, Ohio

[21] Appl. No.: 61,330

[22] Filed: May 13, 1993

Related U.S. Application Data

[63] Continuation of Ser. No. 880,923, May 11, 1992, abandoned.

[51] Int. Cl.⁵ ............................................. F16J 15/32
[52] U.S. Cl. ...................................... 277/53; 277/55; 415/173.5
[58] Field of Search ...................... 277/53, 55, 57, 58, 277/23; 415/173.3, 173.4, 173.5, 174.2

[56] References Cited

U.S. PATENT DOCUMENTS

| | | |
|---|---|---|
| Re. 30,206 | 2/1980 | Ferguson et al. |
| Re. 30,600 | 5/1981 | Long et al. |
| 885,032 | 4/1908 | De Ferranti |
| 2,878,048 | 3/1959 | Peterson |
| 3,917,150 | 11/1975 | Ferguson et al. |
| 4,202,554 | 5/1980 | Snell |
| 4,204,629 | 5/1980 | Bridges |
| 4,218,189 | 8/1980 | Pask |
| 4,265,455 | 5/1981 | Lundgren |
| 4,269,420 | 5/1981 | Persson |
| 4,358,120 | 11/1982 | Moore |
| 4,411,594 | 10/1983 | Pellow et al. |
| 4,415,309 | 11/1983 | Atterbury |
| 4,595,207 | 6/1986 | Popp |
| 4,600,202 | 7/1986 | Schaeffler et al. |
| 4,645,362 | 2/1987 | Orte |
| 4,678,113 | 7/1987 | Bridges et al. |
| 4,696,480 | 9/1987 | Jornhagen |
| 4,755,103 | 7/1988 | Streifinger |
| 4,756,536 | 7/1988 | Belcher |
| 4,781,388 | 11/1988 | Wohrl et al. |
| 4,809,990 | 3/1989 | Merz |
| 4,971,336 | 11/1990 | Ferguson |
| 5,026,252 | 6/1991 | Hoffelner |
| 5,029,875 | 7/1991 | Spain et al. |
| 5,031,922 | 7/1991 | Heydrich |
| 5,042,823 | 8/1991 | MacKay et al. .................. 277/53 |
| 5,064,343 | 11/1991 | Mills ............................ 415/173.3 |
| 5,074,748 | 12/1991 | Hagle .............................. 277/53 |
| 5,106,104 | 4/1992 | Atkinson et al. ................. 277/53 |

FOREIGN PATENT DOCUMENTS

| | | |
|---|---|---|
| 2250790A | 6/1972 | United Kingdom |
| 2191825 | 12/1987 | United Kingdom ........... 277/53 |
| 2214998 | 9/1989 | United Kingdom |
| 9121398.3 | 10/1991 | United Kingdom |
| 2250789A | 6/1992 | United Kingdom |

Primary Examiner—Thomas B. Will
Assistant Examiner—Daniel G. DePumpo
Attorney, Agent, or Firm—Jerome C. Squillaro

[57] ABSTRACT

An improved brush seal for reducing swirl, recirculation and turbulence of an approaching gas stream to reduce irregular bristle wear and operating costs. The brush real may include a baffle of the honeycomb type or circumferentially stacked plates type, positive or negative steps in the flow path approaching a seal stage, and recirculation breakers.

9 Claims, 4 Drawing Sheets

BRUSH SEAL

This application is a continuation of application Ser. No. 07/880,923, filed May 11, 1992, now abandoned.

The present invention relates in general to a sealing element and in particular to a brush seal that is less subject to irregular bristle wear and that is interposed in the leakage path between rotating and stationary members of a gas turbine engine.

BACKGROUND OF THE INVENTION

A turbofan gas turbine engine operates according to well known principles wherein an incoming air stream flows through the engine along an annularly configured, axially extending flow path. A portion of the incoming air stream is compressed in a compressor section of the engine and then mixed with fuel and burned in a combustor section to produce a high energy, high temperature exhaust gas stream. The gas stream exits the combustor and subsequently passes through a turbine section that extracts energy from the exhaust gas stream to power the compressor and produce bypass thrust by rotating a fan that acts generally on the remaining portion of the incoming air stream.

Uncontrolled leakages of gases within the engine contributes to a reduced engine efficiency. Seals are used to control this energy loss by interposing them in a leakage path to reduce the volume or mass of the gas—atmospheric air, exhaust, or otherwise—passing from one part of the engine to the other. In the past engine seals have principally taken the form of labyrinth seals. The use of brush seals as a substitute for labyrinth seals is presently being investigated.

A typical brush seal includes a plurality of seal stages with each stage including a plurality of bristles disposed between a pair of annularly configured plates. Usually the bristles are disposed at about a forty five degree angle to a radius drawn from the engine center line. A brush seal is usually attached along its outer circumferential edge to a stationary portion of the engine with the inward, free ends of the bristles disposed in a sealing engagement with a sealing surface on a rotating engine part. Because the bristles are somewhat flexible, they are able to bend during an engine transient and still retain their sealing ability after the transient has passed. Examples of such transients include differential thermal growth between the engine parts, rotor/stator relative movement, and vibration of some sort. Thus, a rotating engine shaft, for example, may enter a vibration mode where the shaft is vibrating about its longitudinal axis.

The sealing efficiency of a brush seal over time is affected by the wear on the bristle ends contacting the sealing surface on the opposing engine part, as well as the overall contact of the bristle ends with the sealing surface. Worn bristles ends will dictate replacement of the seal or particular seal stage earlier than otherwise would be necessary, thereby increasing engine operating costs. Because the bristles are not directed along true radii to the engine center line, but rather are angled at about forty five degrees relative thereto, excessive, irregular wear of the bristles may result from an adversary gas flow field, that is, a gas flow field that includes substantial velocity vectors disposed at angles other than perpendicularly to the seal. This adversary flow field can reduce the compactness of the bristle pack, which permits the individual bristles of the bristle pack to move randomly with a higher degree of freedom than the bristles of a seal not encountering such an adversary flow. When the bristles are tightly packed, they wear better over time and seal more efficiently. This enlarged freedom of bristle movement from the adversary flow field results in the bristles being displaced and rubbing, which in turn creates bristle wear.

Stated otherwise, any gas that encounters the seal that has a swirl, recirculation, or turbulence associated therewith will move the bristle ends and will contribute to unwanted bristle wear, often called tufting when originating from these causes. In common parlance, swirl is a rotational movement of the fluid molecules; recirculation is a radial movement of the fluid molecules; and turbulence is random, volatile movements of the fluid molecules. Thus, a radially outwardly directed recirculation, for example, can lift the bristles, which are usually attached at their radially outer but not their radially inner ends, thereby fluffing them and reducing their density. Additionally, an upstream jet flow, which forms part of the gas adversary flow, will vibrate the loosely packed or fluffed bristles and may open a small gap between the bristle ends and the sealing surface such that air can freely pass by an upstream seal stage and encounter a downstream seal stage with great velocity. This, in turn, will cause irregular wear on the downstream seal stage and may open a leakage gap at the adjacent downstream stage also, again allowing free passage of air or gas and greatly reducing engine efficiency.

It would be desirable to increase the lifetime and sealing efficiency of brush seals by reducing bristle wear caused by swirling, turbulent, recirculating air or gas flowing through the seal by reducing or eliminating the radially outwardly directed recirculating air or gas, the jet stream, or the turbulence associated with the air passing through the seal.

SUMMARY OF THE PRESENT INVENTION

There is provided by the present invention apparatus including a brush seal and a means for reducing the swirl, recirculation or turbulence of an incoming gas stream approaching the various seal stages. The swirl reducing apparatus may include an annularly configured baffle member disposed upstream of a brush seal stage. The baffle may be made of honeycomb material or a plurality of circumferentially stacked, radially directed plates. In addition, the leakage path between the rotating and stationary members may include either a positive or negative step to aid in the reduction of the jet stream velocity. Where a negative step is introduced into the leakage path, an air deflector along the radially interior portion of the leakage path may be included so as to deflect air into the baffle rather than allowing it to pass directly through the clearance gap between the baffle and the rotating member. Additionally, for downstream seal stages, the backing or downstream plate of an upstream seal stage may include a plurality of bypass holes and a recirculation breaker comprising a flange extending from the backing plate of the upstream stage downstream towards the upstream side of the downstream adjacent stage.

The foregoing invention and its advantages over the prior art will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
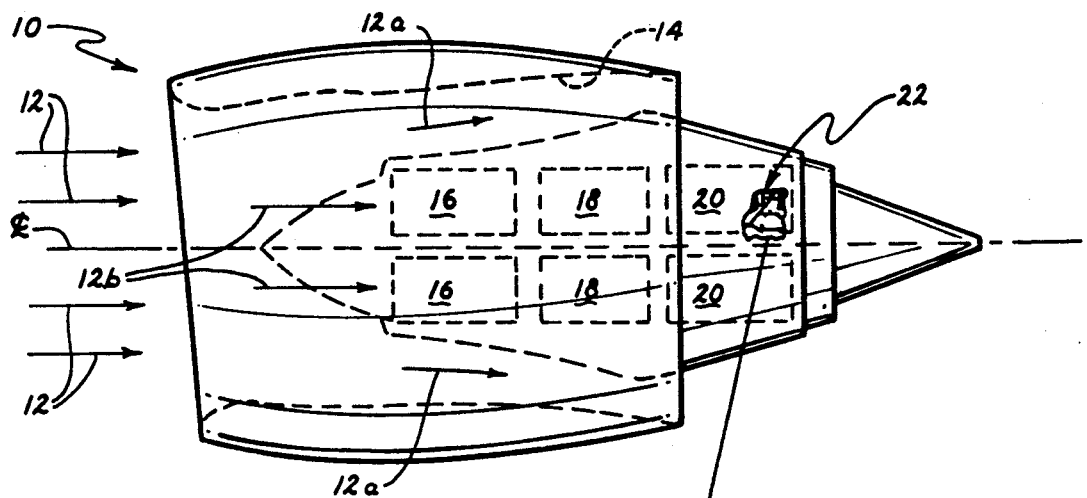
FIG. 1 shows a gas turbine engine in a partial schematic profile and includes a broken away portion wherein an application of the present invention is described.

The present invention is described and shown in the accompanying FIGS. 1-7 relative to its application in an aircraft gas turbine engine 10 shown in a combined schematic, profile drawing in FIG. 1. As noted before, and as is well known, an incoming air stream indicated by arrows 12 enters the engine 10 with a portion thereof indicated by arrows 12a flowing through a bypass duct 14 to produce bypass thrust and the remaining portion of the airstream as indicated by arrows 12b entering the compressor section 16. The air is compressed in the compressor section 16 and passed to the combustor section 18 where it is mixed with fuel and the air/fuel mixture ignited. The ignited air/fuel mixture produces a high-energy, high-temperature, high-velocity exhaust stream that passes through the turbine section 20. The turbine section 20 extracts the energy from the exhaust stream and uses the energy to power the compressor and a fan (not shown) that generates the aforementioned bypass thrust. A portion 22 of the engine 10 has been broken away and is shown in more detail in FIG. 2 to illustrate potential applications of the present invention.

Figure 2:
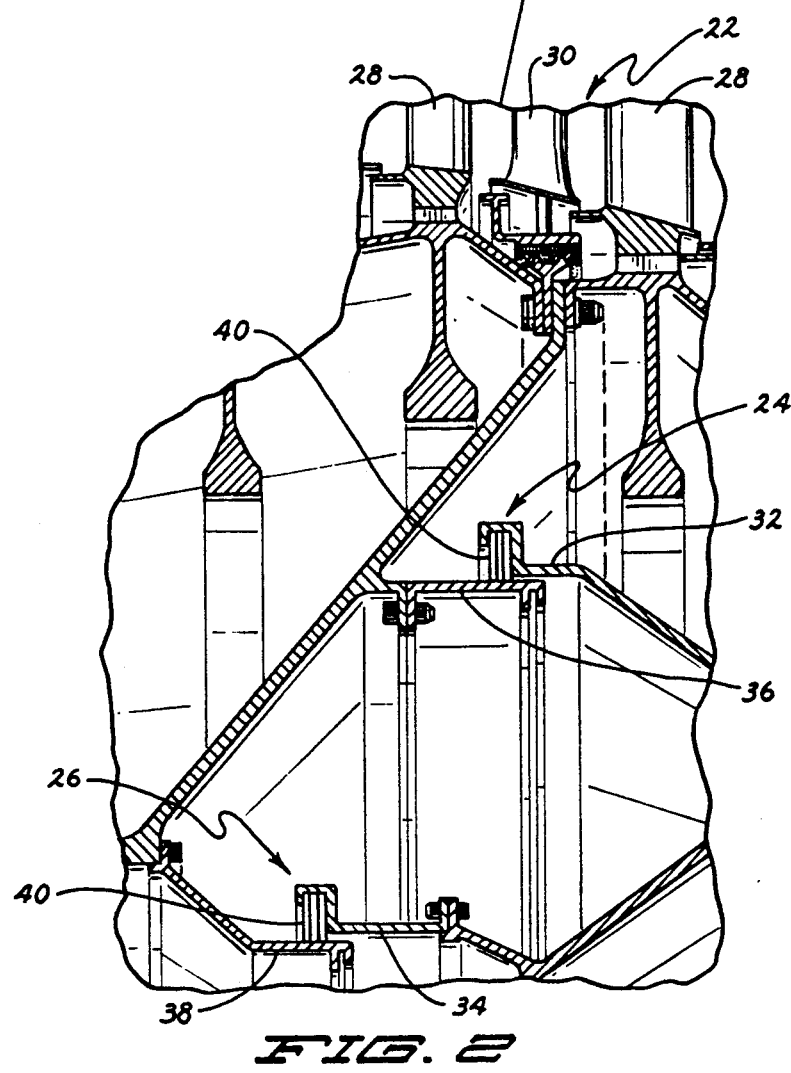
FIG. 2 shows in enlarged detail the broken away portion of FIG. 1 and illustrates in greater detail locations in a gas turbine engine where the present invention may find application.

Referring now to FIG. 2, a pair of brush seals 24 and 26 are shown in place in a portion of a turbine section of a gas turbine engine. As is well known, a turbine section includes a plurality of circumferential rows of substantially radially directed rotor blades 28 interdigitated with one or more circumferential rows of substantially radially extending stator vanes 30. Brush seals 24 and 26 are interposed between stationary engine structural members 32, 34 and rotating members 36, 38, respectively. As generally indicated, seals 24 and 26 each include a plurality of bristles 40 that extend from a fixed connection at one end to stationary member 24 and 26 to a sealing engagement with the rotating members 36 and 38. The configuration of brush seals 24 and 26 will be explained in greater detail with reference to FIGS. 3-8.

Figure 8:
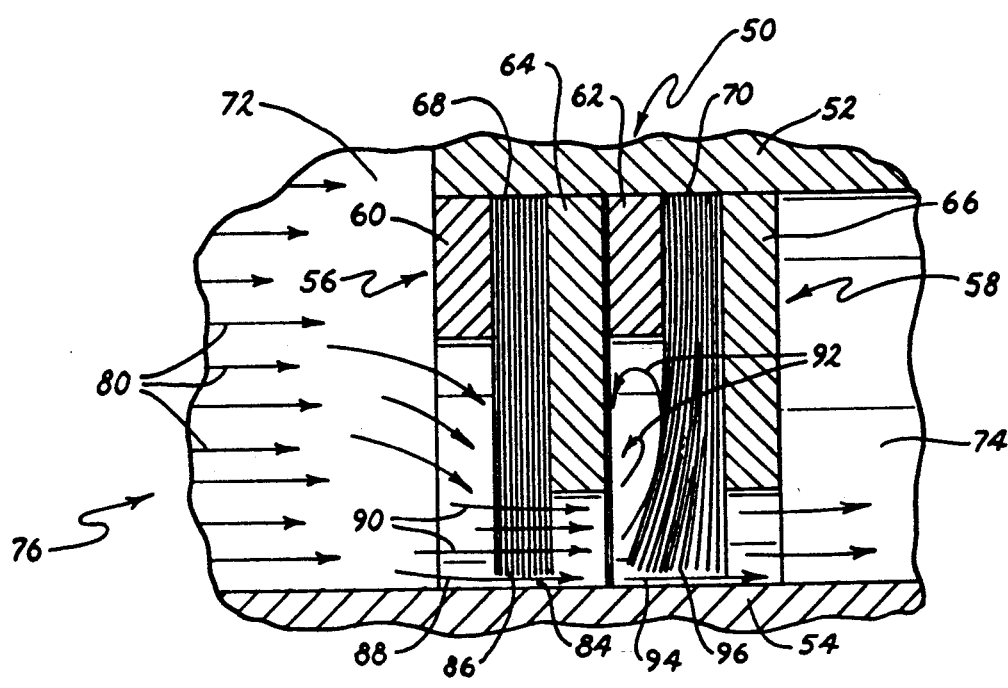
FIG. 8 shows the adversary flow through a brush seal, the flow being created by swirling, turbulent recirculating air of gas encountering the seal.

As noted, FIG. 8 illustrates a prior art application of a brush seal 50. Brush seal 50 is interposed between a stationary member 52 and a rotating member 54. Seal 50 typically comprises a plurality of substantially identical seal stages, here stages 56 and 58. Each stage includes an annularly configured front or upstream plate 60, 62 and an annularly configured rear or downstream plate 64, 66 sandwiching a bristle pack that includes a plurality of bristles 68, 70, respectively. Brush seal 50 is interposed between an upstream portion 72 and a downstream portion 74 of a leakage path 76 existing between members 52 and 54. Brush seal 50 is disposed in leakage path 76 to control the flow of gas through the seal. This gas flow may be an atmospheric air stream, the exhaust gas stream exiting the compressor, or a combination of the two streams, and it will be understood that "gas" as used hereafter refers to both or to any gaseous phase of matter.

As shown in FIG. 8, with the prior art brush seal construction shown, a gas stream as indicated generally by arrows 80 would encounter seal 50. Gas stream 80 will typically have some swirl, recirculation or other turbulence associated therewith, which in an application such as a gas turbine engine, can be quite violent. This swirl, recirculation, or turbulence under certain circumstances can be strong enough so as to deflect bristles 68 sufficiently that a gap 84 is opened between member 54 and the free bristle ends 86 of bristles 68. Thus a blow-by condition is created where gas, as indicated by arrow 88, essentially bypasses the first seal stage 56. In addition, some portion of the gas flow, as indicated by arrows 90, will pass through the bristles in the manner normally intended. The gas indicated by arrows 88 and 90 will mix somewhat between seal stages and create a turbulent, recirculating, swirling air flow as indicated by arrows 92. The arrows indicated by arrows 92 as well as that portion 94 of the air represented by arrow 88 can cause sufficient bristle deflection such that a gap 96 will be opened between stationary member 54 and the free ends 98 of bristles 70. Gaps 84 and 96 allow essentially unobstructed air to pass between upstream and downstream portions 72 and 74 of leakage path 76, thus destroying the effectiveness of the seal 50. In addition, the deflections shown of the bristles will create an irregular wear pattern on the free ends of the bristles themselves. Thus, the bristles at the forward or upstream portion of the bristle pack will experience a greater wear than those downstream. This irregular wear pattern itself will further contribute to the loss of sealing efficiency since it will take less turbulent air to cause the aforementioned deflections to occur, and create a greater likelihood of seal blow-by.

Figure 3:
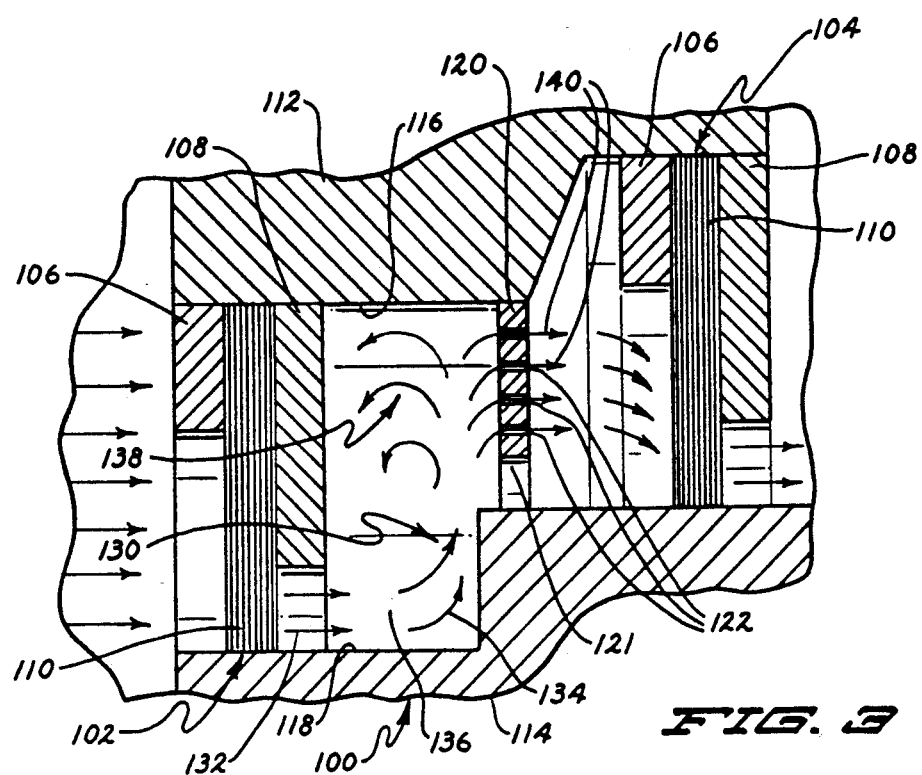
FIG. 3 shows a pair of stages of a multiple stage brush seal having a positive step in the leakage path and a baffle disposed between the seal stages.

FIGS. 3-7 represent various embodiments of the present invention wherein an improved seal includes means for removing the swirl, recirculation and other turbulence from the gas flow entering the seal. Thus, referring now to FIG. 3, a seal 100 comprising at least first and second seal stages 102 and 104. Each seal stage includes an upstream plate 106 and a downstream plate 108 sandwiching therebetween a plurality of bristles 110. Seal 100 is disposed between members 112 and 114. Where seal 100 is disposed in a gas turbine engine such as engine 10, member 114 would generally be a rotating member and member 112 would be stationary. Seal 100 is disposed within the leakage path between members 112 and 114. The leakage path is defined generally by the inwardly directed surface 116 of member 112 and the outwardly directed surface 118 of member 114. As shown in FIG. 3, seal stages 102 and 104 are separated rather than being disposed closely adjacent to one another, as are seal stages 64 and 68 of seal 50, shown in FIG. 8. To control the gas flow and remove the swirl, recirculation and turbulence associated therewith, a baffle 120 is disposed in the leakage path between upstream and downstream seal stages 102 and 104. Baffle 120 may be of a honeycomb type of material and include a plurality of small through holes 122. Through holes 122 will straighten the direction of air flow between the first and second seal stages 102 and 104 by providing a plurality of surfaces oriented generally parallel to a perpendicular drawn to the bristles 110. Thus, velocity components of the gas stream moving through the leakage path will cause the gas molecules simply to collide with the surfaces of the through holes, thereby causing these velocity components to be reduced in strength and resulting in an airflow exiting baffle 120 having reduced swirl, recirculation and turbulence.

Also shown in FIG. 3 is a leakage path having a positive or outward step 130. In this sense, positive or outward is used to refer to a step in the radially outward direction of the stationary member 112 to which the seal stages 102 and 104 are attached. Gas passing through the upstream stage 102, as indicated by arrows 132, will be deflected outwardly by step 130 as indicated by arrows 134. A recirculation cavity 136 will be created between the backing plate 108 of upstream stage 102 and the baffle 120 wherein gas will recirculate as indicated by arrows 138. Air or gas will pass from the recirculation cavity 136 through the through holes 122 as indicated by arrows 140. This gas will have a velocity which is directed substantially perpendicular to the bristle pack 110 of the downstream seal stage 104. As such, this air will not act to create an enlarged degree of individual bristle movement in the downstream seal stage 104, and the irregular bristle wear of the prior art brush seal illustrated in FIG. 8 will be avoided. In addition, because the gas flow encountering the downstream seal stage 104 will have encountered the step 130 as well as baffle 120, there will be a reduced jet flow of gas and thus the likelihood of the actual opening of a gap between the bristle ends and the sealing surface 118, as shown with particular reference to prior art FIG. 8, will be less likely to occur. The embodiment of the present invention shown in FIG. 3 will prevent both irregular bristle wear due to recirculating gases encountering the seal stage and due to the creation of a bypass gap and a high velocity jet flow through the gap hitting loosely packed downstream bristles.

Figure 4:
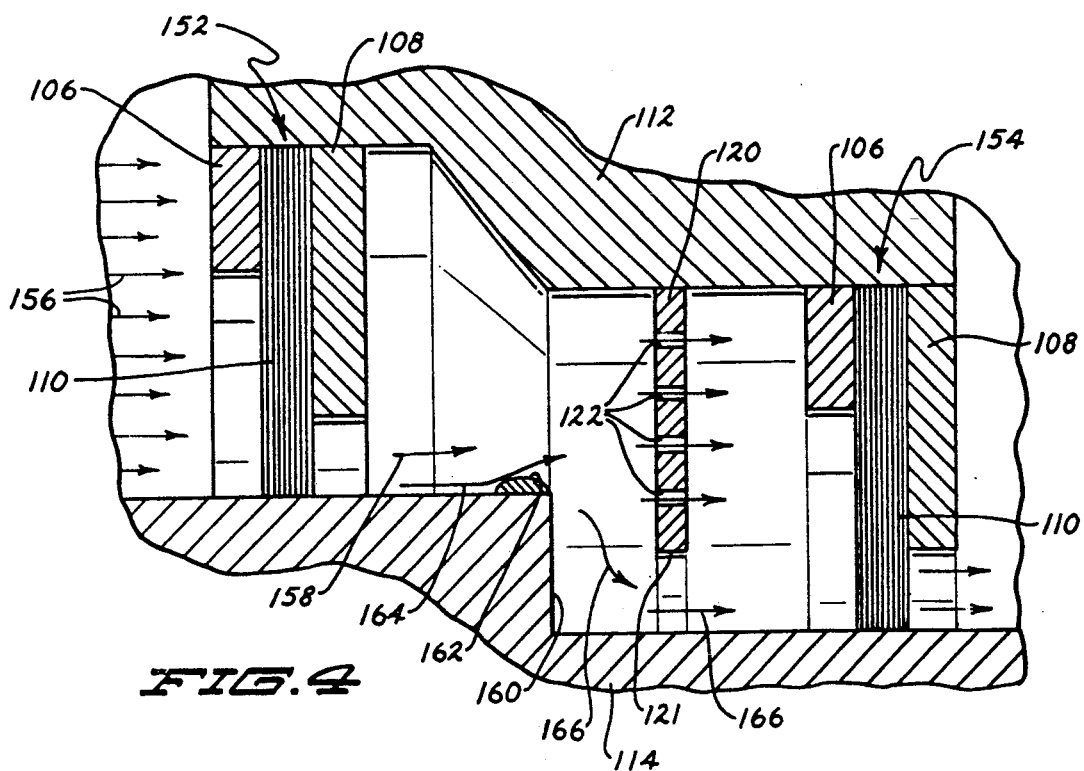
FIG. 4 illustrates another embodiment of the present invention wherein the leakage path includes a negative step and a baffle that is disposed between the seal stages.

FIG. 4 illustrates another embodiment of the present invention similar to that of FIG. 3. Thus, a brush seal 150 including an upstream seal stage 152 and a downstream seal stage 154 is shown disposed between stationary member 112 and rotating member 114. As shown in the Figure, an incoming gas flow indicated by arrows 156 encounters upstream seal stage 152 and passes therethrough as indicated by arrows 158. The leakage path in this embodiment, however, includes a negative or inward step 160. In this sense, negative and inward refer to the generally radially inward direction, that is, towards the engine centerline. Thus, the gas flow 158 that passes through upstream seal stage 152 passes either directly towards baffle 120, which is disposed between the upstream and downstream seal stages 152 and 154, or encounters a deflector 162 as indicated by arrow 164. The gas flow, as indicated by arrows 158 and 164, will pass through the through holes 122 of baffle 120 or will bypass the baffle 120 in the tolerance gap 121 existing between the inner end of the baffle 120 and the rotating member, as indicated by arrows 166. In any event, the air moving downstream of baffle 120 and encountering downstream seal stage 154 will have reduced swirl, recirculation and turbulence associated therewith and therefore will not act to displace the bristles in the manner shown with respect to prior art FIG. 8. Deflector 162, which acts to deflect the gas stream as shown by arrow 164 can be machined into the rotating member during manufacture thereof, or can be added after the manufacture of member 114. Deflector 162 deflects the gas into the baffle 120, which as previously noted, acts to reduce the swirl or turbulence of the gas passing therethrough.

Figure 5:
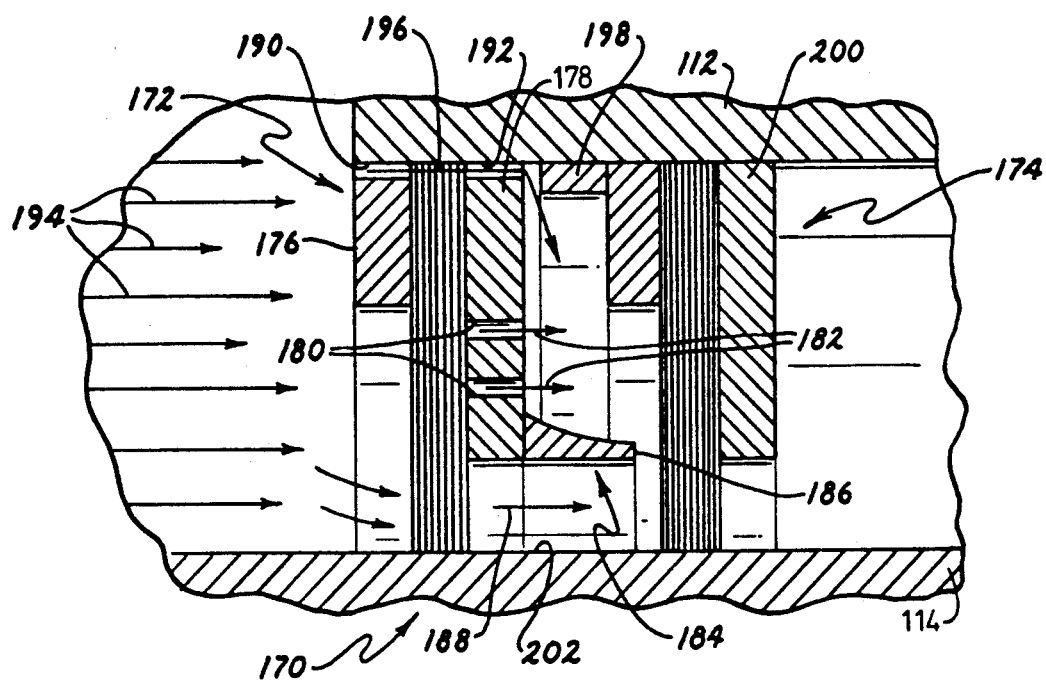
FIG. 5 illustrates another embodiment of the present invention wherein the backing plate of an upstream seal stage includes a plurality of holes and downstream extending flange.

FIG. 5 shows yet another embodiment of the present invention wherein a seal 170 including upstream and downstream stages 172 and 174, respectively, is interposed in a leakage path between a stationery member 112 and a rotating member 114. In this embodiment, the recirculation of the air between the upstream and downstream seal stages 172 and 174 is reduced by using the upstream and downstream plates 176 and 178, respectively, of the upstream seal stage 172 as a type of baffle. Thus, the downstream plate 178 may include a plurality of through holes 180 that will allow a gas flow as indicated by arrows 182 to pass substantially directly therethrough and to encounter the downstream seal stage 174. To further reduce swirl, recirculation, and turbulence, the downstream plate 178 may include a recirculation breaker 184 comprising a downstream extending flange that is attached to or formed integrally with downstream plate 178. Recirculation breaker 184 further inhibits the upward or outwardly directed velocity components of the gas flow 188 that passes through the bristles of the upstream seal stage 172 by substantially inhibiting movement of the gas flow in a radially outward direction, which as earlier noted lifts the free ends of the bristles and fluffs them.

In addition to the through holes 180, both the upstream plate 176 and the downstream plate 178 may include a plurality of through holes 190 and 192 respectively disposed along their outer peripheries where they are attached to the stationery member 112. Through holes 190 and 192 allow gas from the incoming gas flow 194 to pass substantially directly therethrough along the outer edge of the seal as indicated by arrow 196. This gas flow 196 encounters a deflector 198 which is attached to stationary member 112 between the downstream plate 178 and the upstream plate 200 of downstream seal stage 174. Deflector 198 thus directs the bypass gas 196 inwardly towards the sealing surface on member 114. This gas and thus any gas directed toward the downstream seal stage 174 between the recirculation breaker 184 and the stationary member 112 will therefore have a velocity component directed along the bristles towards the sealing surface 202 rather than a velocity component that is directed in the other direction. This reduces the tendency of the bristle ends to be blown away from the sealing surface, that is, to be fluffed. Thus, the bypass holes 180, and 190, and 192, and the recirculation breaker 184, each function to remove the swirl, recirculation and turbulence associated with the gas flow approaching the downstream seal stage 174 and thereby reduce bristle wear and increase the seal's lifetime and efficiency.

Figure 6:
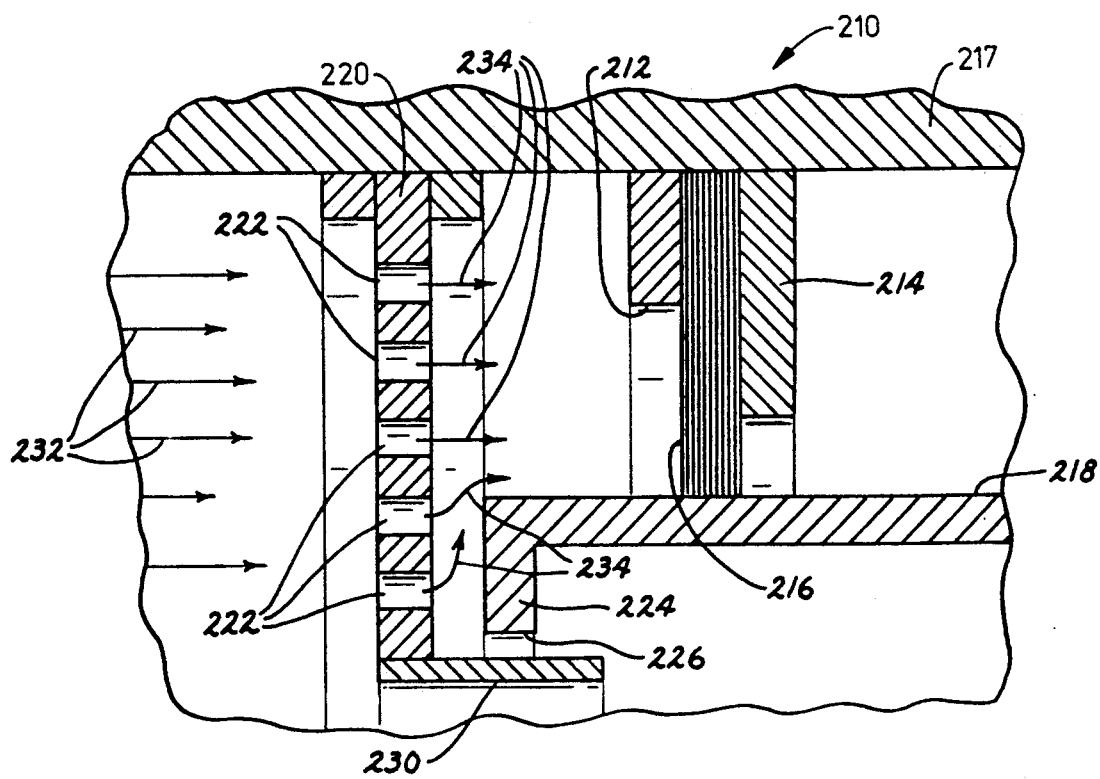
FIG. 6 illustrates a baffle disposed upstream of seal stage, the baffle including a downstream extending flange that discourages recirculation of air around the baffle.

FIG. 6 illustrates an embodiment of the present invention that reduces wear on the bristles of a brush seal stage and is useful primarily with the first or most upstream stage of such a seal. Thus, in FIG. 6, an upstream seal stage 210, which comprises an upstream plate 212 and a downstream plate 214 and a bristle pack including a plurality of bristles 216 sandwiched therebetween, is disposed in the leakage path between a stationary member 217 and a rotating member 218. Upstream of the seal stage 210, a baffle 220 is shown attached to the stationary member 217. Baffle 220 includes through holes 222. Baffle 220 is shown disposed between retaining rings 224 and 226 respectively. As shown in the embodiment of FIG. 6, the rotating member 218 includes a radially inwardly extending flange 224. Flange 224 has an inner edge or surface 226. Baffle 220 in turn includes a flange 230 that extends downstream from the inner edge thereof inwardly of the inner edge 226 of flange 224. Flange 230 functions as a recirculation breaker or discourager to prevent gas from passing around the inner edge of baffle 220, which thereby prevents an outwardly directed air flow relative to the inwardly extending bristles 216. An approaching gas flow as indicated by arrows 232, which may include substantial amounts of swirl, recirculation and turbulence, will have those velocity components removed by the baffle 220 such that the gas passing through the baffle as indicated by arrows 234 will have a substantially reduced swirl or turbulence. Thus, with the embodiment shown in FIG. 6, which is particularly useful with the first stage of a single multiple stage brush seal, the air encountering the seal stage will have a reduced swirl or turbulence associated therewith and the seal stage will experience reduced irregular bristle wear.

Figure 7:
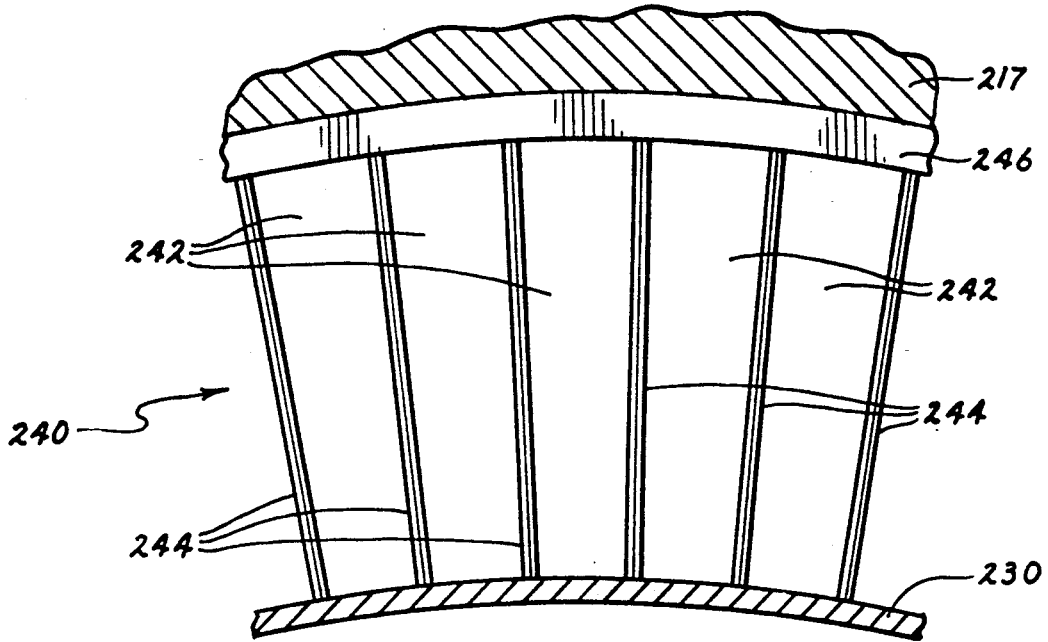
FIG. 7 illustrates a baffle comprising a plurality of stacked plates extending circumferentially with the seal.

FIG. 7 illustrates another embodiment of the present invention wherein rather than a baffle of the honeycomb type as shown in FIGS. 2-6, a baffle comprising a plurality of stacked plates is shown. Thus, FIG. 7 shows, in a plan view looking upstream taken along an engine centerline, a baffle 240 comprising a plurality of radially disposed plates 242. Plates 242 are spaced apart to define a gap 244 therebetween through which gas flow may occur. Baffle 240 includes an downstream retaining ring 246 and an upstream, but not shown, retaining ring that sandwiches the parallel plates therebetween. Baffle 240 is attached to an engine stationary member 217 in the same manner as is honeycomb baffle 220 shown in FIG. 6. Baffle 240 may further include a flange 230, shown here in cross-section, similar to that shown in FIG. 6 to reduce or eliminate the radially outwardly directed recirculation of air or gas passing through the seal. Plates 242 may have substantially planar, parallel confronting surfaces that interact with the air or gas flow passing therethrough to reduce the swirl, recirculation and turbulence associated with the gas flow, thereby reducing bristle wear as previously discussed.

Thus the present invention provides an improved brush seal that is subject to less irregular bristle wear and results in greater engine efficiency. Each embodiment of the improved brush seal shown and described herein includes a structural member that reduces the swirl or turbulence associated with the gas stream approaching a seal stage. The present invention when utilized in a gas turbine engine will result in a brush seal having a greater lifetime due to a reduction in regular bristle wear as well as a more efficient seal, which will increase overall engine efficiency and reduce operating costs.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

We claim:

1. A brush seal for sealing a leakage path between a rotating member and a stationary sealing member, said brush seal having a plurality of stages, each said stage including a plurality of bristles sandwiched between upstream and downstream plates, each said upstream plate being spaced from said rotating member so as to form a seal stage gap at each seal stage, said seal further including a baffle substantially duplicating at the downstream stages the flow stream entering said first stage seal gap of said seal, said baffle being disposed between and spaced from downstream plate of an upstream seal stage and an upstream plate of a downstream seal stage where said flow is to be substantially duplicated, said baffle further being spaced from said bristles, and said baffle substantially directing said flow stream into said next downstream seal stage gap, wherein said baffle reduces downstream stage irregular bristle wear by reducing radially outwardly directed velocity components of the flow stream, the jet stream, and turbulence associated with the flow stream.

2. The brush seal of claim 1 wherein the flow path between said upstream and said downstream seal stages is defined in part by a positive step and wherein said baffle is disposed downstream of said positive step.

3. The brush seal of claim 1 wherein the flow path between said upstream and said downstream seal stages is defined in part by a negative step and wherein said baffle is disposed downstream of said negative step.

4. The brush seal of claim 3 wherein said bristles each include a fixed end and a free end and wherein the flow path between said upstream and said downstream seal stages includes a deflector disposed upstream of said negative step for deflecting the flow stream through the seal toward the fixed ends of said bristles.

5. The brush seal of claim 1 wherein the downstream plate of an upstream seal stage has inner and outer ends, said inner end being closely spaced from said sealing member, said downstream plate of said upstream seal stage being spaced from the upstream plate of the next adjacent downstream seal stage and wherein said downstream plate of said upstream seal stage includes a recirculation breaker extending downstream from said inner end of said downstream plate of said upstream seal stage, said recirculation breaker being provided for inhibiting recirculation within said seal in the space between said inner and outer ends of said downstream plate between adjacent upstream and downstream seal stages of the air passing through the upstream seal stage, wherein said recirculation breaker has a length substantially equal to that of the space between said upstream and downstream seal stages.

6. A brush seal for sealing a leakage path between a rotating member and a stationary member of a gas turbine engine, said brush seal comprising at least one seal stage including a plurality of bristles disposed between an upstream plate and a downstream plate, said brush seal being disposed between said rotating member and said stationary member, said leakage path having a substantially annular configuration and defined in part by a gap between said upstream plate and said rotating member, said brush seal including a baffle for deswirling air entering said brush seal, said baffle being disposed upstream and spaced from a most upstream seal stage of said brush seal, said baffle further being spaced from said bristles, and said baffle reducing the swirl of the air entering said seal.

7. The brush seal of claim 6 wherein said baffle comprises a honeycomb material.

8. The brush seal of claim 6 wherein said baffle comprises a plurality of circumferentially disposed, spaced apart plates defining gaps therebetween for airflow through said baffle.

9. The brush seal of claim 6 wherein said rotating member includes a radially inwardly projecting flange and said baffle further includes a downstream projecting flange attached to said baffle radial inner side, said downstream projecting flange and said inwardly projecting rotating member flange cooperating to inhibit air from passing around said baffle into said seal.

* * * * *